US012593188B2

(12) United States Patent
Wang et al.

(10) Patent No.: US 12,593,188 B2
(45) Date of Patent: Mar. 31, 2026

(54) DIAPHRAGM FOR SOUND GENERATING DEVICES AND PREPARATION METHOD THEREOF, AND SOUND GENERATING DEVICE

(71) Applicant: GOERTEK INC., Weifang (CN)

(72) Inventors: Ting Wang, Weifang (CN); Chun Li, Weifang (CN); Qiulin Wei, Weifang (CN)

(73) Assignee: GOERTEK INC., Weifang (CN)

( * ) Notice: Subject to any disclaimer, the term of this patent is extended or adjusted under 35 U.S.C. 154(b) by 188 days.

(21) Appl. No.: 18/561,760

(22) PCT Filed: May 26, 2022

(86) PCT No.: PCT/CN2022/095300
§ 371 (c)(1),
(2) Date: Nov. 17, 2023

(87) PCT Pub. No.: WO2022/247912
PCT Pub. Date: Dec. 1, 2022

(65) Prior Publication Data

US 2024/0251215 A1 Jul. 25, 2024

(30) Foreign Application Priority Data

May 26, 2021 (CN) ......................... 202110606241.0

(51) Int. Cl.
*H04R 31/00* (2006.01)
*H04R 7/04* (2006.01)

(52) U.S. Cl.
CPC ............. *H04R 31/003* (2013.01); *H04R 7/04* (2013.01); *H04R 2307/025* (2013.01)

(58) Field of Classification Search
CPC . H04R 7/045; H04R 7/04; H04R 7/06; H04R 2307/025
See application file for complete search history.

(56) References Cited

U.S. PATENT DOCUMENTS

2009/0203871 A1 8/2009 Maruyama et al.
2010/0046773 A1 2/2010 Windischberger et al.
(Continued)

FOREIGN PATENT DOCUMENTS

CN 101341186 A 1/2009
CN 101605833 A 12/2009
(Continued)

OTHER PUBLICATIONS

International Search Report from International Application No. PCT/CN2022/095300 mailed Aug. 19, 2022.

*Primary Examiner* — Sunita Joshi
(74) *Attorney, Agent, or Firm* — Shih IP Law Group, PLLC

(57) ABSTRACT

The present invention relates to a diaphragm for sound generating devices and a preparation method thereof, and a sound generating device. The diaphragm for sound generating devices comprises only one layer of a thermoplastic polyester elastomer film, wherein the thermoplastic polyester elastomer is formed by copolymerization of a polyester hard segment which is prepared by reacting an aromatic dicarboxylic acid with a dihydric alcohol and a soft segment containing an aliphatic polycarbonate, and the diaphragm has a thickness of 10-200 μm , and a loss factor of 0.1-0.3 at a temperature of 23° C. The thermoplastic polyester elastomer used for the diaphragm of the present invention is composed of the polyester hard segment and the aliphatic polycarbonate soft segment, and such material not only solves the problem that the existing thermoplastic elastomers have poor resistances to high temperatures and chemicals, but also has the advantages of improving sensitivity etc.

11 Claims, 3 Drawing Sheets

(56) References Cited

U.S. PATENT DOCUMENTS

| | | | |
|---|---|---|---|
| 2014/0238570 | A1 | 8/2014 | Shimizu et al. |
| 2014/0262599 | A1 | 9/2014 | Bokaemper et al. |
| 2017/0306628 | A1 | 10/2017 | Simonis et al. |

FOREIGN PATENT DOCUMENTS

| | | | | | |
|---|---|---|---|---|---|
| CN | 102821345 | A | | 12/2012 | |
| CN | 108503783 | A | | 9/2018 | |
| CN | 108551640 | A | * | 9/2018 | ............... H04R 9/02 |
| CN | 109417670 | A | | 3/2019 | |
| CN | 113490125 | A | | 10/2021 | |
| CN | 113490126 | A | | 10/2021 | |
| EP | 3809721 | A1 | | 4/2021 | |
| JP | 2007191666 | A | | 8/2007 | |
| JP | 2009290815 | A | | 12/2009 | |
| JP | 2011094000 | A | | 5/2011 | |
| JP | 2018050169 | A | | 3/2018 | |
| JP | 2020075993 | A | | 5/2020 | |
| JP | 7256981 | B2 | * | 4/2023 | |
| KR | 20130139607 | A | | 12/2013 | |
| WO | 2019237607 | A1 | | 12/2019 | |

* cited by examiner

DIAPHRAGM FOR SOUND GENERATING DEVICES AND PREPARATION METHOD THEREOF, AND SOUND GENERATING DEVICE

TECHNICAL FIELD

The invention relates to the field of electroacoustic technology, and particularly to a diaphragm for sound generating devices and a preparation method thereof, and a sound generating device.

BACKGROUND ART

With an increase of performance requirements for loudspeaker in the industry, there are more products pursuing higher loudness, high-quality sound and high-level waterproof and the like. The existing loudspeaker diaphragm is mostly made of composite structural materials, including engineering plastics (e.g. PEEK, PAR, PET, PI, PEI, etc.) as the base layer, acrylic rubber and silica gel layer and the like as the damping layer, and thermoplastic elastic material, which takes into account both the modulus and damping, as the rebound layer. When such composite film is used as a loudspeaker diaphragm, it cannot fully match the requirements of higher loudness, high-quality sound and high-level waterproof etc. In recent years, since thermoplastic polyester elastomer can effectively improve the resilience of diaphragm, reduce the membrane folding of diaphragm, and reduce the distortion caused by the sudden vibration of the diaphragm etc., more and more products apply such material as the loudspeaker diaphragm to meet the product's demand for high-quality such as sound quality and waterproof.

At present, the thermoplastic polyester elastomer commonly used in the loudspeaker industry is polyether-polyester type, which still has deficiencies in high temperature resistance, chemical resistance and the like. Although more types of thermoplastic polyester elastomers have been reported in other industries, for example, a thermoplastic polyester elastomers synthesized with a polybutylene terephthalate hard segment and an aliphatic polycarbonate soft segment, however, it is used as insulating materials, housing materials and the like which are different from the materials used for sound generation. Therefore, the materials pay more attention to the optimization of properties such as insulation, tensile strength and the like, while the acoustic properties such as chemical resistance, damping, and minimum resonance frequency are ignored, resulting in the inability to be used for the diaphragm.

Therefore, the present invention is proposed.

SUMMARY

It is the main object of the present invention to provide a diaphragm for sound generating devices, wherein a thermoplastic polyester elastomer is composed of a polyester hard segment and a aliphatic polycarbonate soft segment, and the material not only solves the problems of existing thermoplastic elastomers having poor resistance to high temperatures and chemicals, but also improves the sensitivity, and can also well achieve the basic properties such as stiffness, resilience and damping required by the vibration of the diaphragm.

It is another object of the present invention to provide a preparation method of the above diaphragm, which has a simple process and has no harsh process conditions.

It is another object of the present invention to provide a sound generating device, which is provided with the diaphragm in the above-mentioned embodiment of the present invention, and the diaphragm is used to vibrate and generate sound.

It is still another object of the present invention to provide a sound generating device, which is provided with the diaphragm in the above-mentioned embodiment of the present invention, and the diaphragm is used to balance the vibration of a voice coil.

In order to achieve the above objectives, the present invention provides the following technical solutions.

A diaphragm for sound generating device according to the embodiment of the first aspect of the present invention includes only one layer of thermoplastic polyester elastomer film;

- the thermoplastic polyester elastomer is formed by means of copolymerization of a polyester hard segment resulting from a reaction of an aromatic dicarboxylic acid with a dihydric alcohol and a soft segment containing an aliphatic polycarbonate;
- wherein the diaphragm has a thickness of 10-200 μm and a loss factor of 0.1-0.3 at a temperature of 23° C.

According to some embodiments of the present invention, the aliphatic polycarbonate comprises polyhexamethylene polycarbonate diol and accounts for 70% or more of a weight of the soft segment.

According to some embodiments of the present invention, the soft segment further comprises one or more selected from the group consisting of polycaprolactone, polybutylene adipate, polytetrahydrofuran ether, and polyethylene oxide.

According to some embodiments of the present invention, the soft segment accounts for 20%-80% by weight of the thermoplastic polyester elastomer.

According to some embodiments of the present invention, the soft segment accounts for 30%-60% by weight of the thermoplastic polyester elastomer.

According to some embodiments of the present invention, the hard segment comprises polybutylene terephthalate.

According to some embodiments of the present invention, the diaphragm has a loss factor of 0.1-0.2 at a temperature of 23° C.

According to some embodiments of the present invention, at a temperature of 23° C.:

- when the sound generating device has a lowest resonance frequency F0≤500 Hz, the diaphragm has a tensile modulus of 20-100 Mpa; and
- when the sound generating device has a lowest resonance frequency F0>500 Hz, the diaphragm has a tensile modulus of 50-400 MPa.

According to some embodiments of the present invention, the diaphragm has a ratio between the storage modulus in the MD and TD directions of 80-120:100.

A method for preparing the diaphragm according to the embodiment of the second aspect of the present invention includes:

carrying out a copolymerization reaction of a prepolymer of the hard segment and a prepolymer of the soft segment at a temperature of preferably 230-265° C. for preferably 0.5-2 h; and forming a film by pelletizing and extruding.

According to some s of the present invention, the prepolymer of the hard segment has a molecular weight of is 15000-30000, and the prepolymer of the soft segment has a molecular weight of 10000-50000.

A sound generating device according to the embodiment of the third aspect of the present invention includes a vibration system and a magnetic circuit system matched with the vibration system, the vibration system comprises a diaphragm and a voice coil coupled to a side of the diaphragm, the magnetic circuit system drives the voice coil to vibrate so that the diaphragm generates sound, and the diaphragm is the diaphragm described in any one of claims 1-9.

A sound generating device according to the fourth aspect of the present invention includes a housing and a magnetic circuit system and a vibration system disposed in the housing, the vibration system includes a voice coil, a first diaphragm and a second diaphragm, the top of the voice coil is connected to the first diaphragm, the magnetic circuit system drives the voice coil to vibrate to drive the first diaphragm to generate sound, the two ends of the second diaphragm are respectively connected to the housing and the bottom of the voice coil, and the second diaphragm is the diaphragm according to any one of claims 1-9.

Compared with the prior art, the present invention utilizes the respective advantages of the polyaromatic dicarboxylic acid diol ester hard segment and the soft segment containing polyhexamethylene polycarbonate diol, and increases the ratio of polyhexamethylene polycarbonate diol in the soft segment, so as to play a synergistic effect, maximize strengths and avoid weaknesses. The film formed after copolymerization is more suitable for the diaphragm, which can significantly improve the resistance to high temperatures and chemicals and sensitivity, and can improve the working reliability under a long-term high temperature and/or high humidity environment of the product. Simultaneously, the diaphragm in the present invention can also achieve various acoustic performances such as stiffness, resilience, damping, distortion, etc., and can solve the polarization and distortion problems that occur during the vibration of the product.

BRIEF DESCRIPTION OF DRAWINGS

Various other advantages and benefits will become apparent to those of ordinary skill in the art upon reading the following detailed description of the preferred embodiment. The drawings are only for the purpose of illustrating a preferred embodiment and are not to be considered as limiting the invention.

DETAILED DESCRIPTIONS

Figure 1:
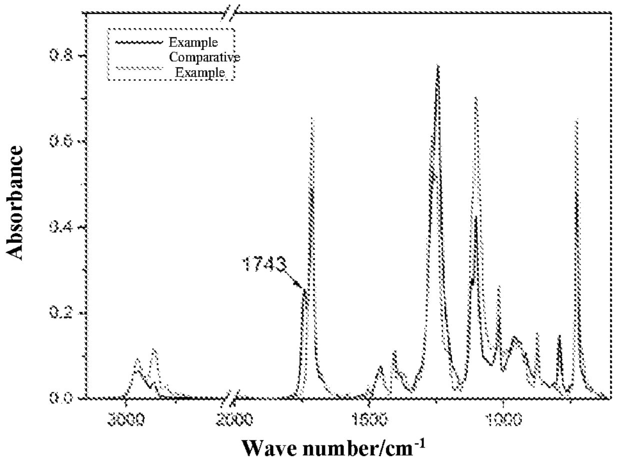
FIG. 1 is the infrared spectrogram of the resin material of Example and Comparative Example.

Embodiments of the present invention will be described in detail below in conjunction with examples, but those skilled in the art will understand that the following examples are only for illustrating the present invention, and should not be considered as limiting the scope of the present invention. The specific conditions which are not described in the embodiment are carried out according to the conventional conditions or the conditions suggested by the manufacturer. The original drugs, reagents or instruments which are not indicated the manufacturer are all conventional products that can be purchased or can be prepared according to the existing technology.

The present invention provides a diaphragm for sound generating device, including only one layer of thermoplastic polyester elastomer film; the thermoplastic polyester elastomer is formed by means of copolymerization of a polyester hard segment resulting from a reaction of an aromatic dicarboxylic acid with a dihydric alcohol and a soft segment containing an aliphatic polycarbonate; wherein the diaphragm has a thickness of 10-200 μm and a loss factor of 0.1-0.3 at a temperature of 23° C.

The present invention utilizes the respective advantages of the polyaromatic dicarboxylic acid diol ester hard segment and the aliphatic polycarbonate soft segment, so as to play a synergistic effect, maximize strengths and avoid weaknesses. The film formed after copolymerization is more suitable for the diaphragm, which can significantly improve the resistance to high temperatures and chemicals and sensitivity, and can improve the working reliability under a long-term high temperature and/or high humidity environment of the product. Simultaneously, the diaphragm in the present invention can also achieve various performances such as stiffness, resilience, damping, distortion, etc., and can solve the polarization and distortion problems that occur during the vibration of the product. In addition, compared with traditional diaphragm, the diaphragm of the present invention has a significant advantage in that: since the diaphragm has a relatively high damping performance and a good rigidity, only one layer of thermoplastic polyester elastomer film is needed to meet the actual use demand, the structure is simpler, and the preparation is also easier.

After testing, compared with the prior art, the present invention can at least achieve the following effects:

(1) The operating temperature range of the diaphragm is widened, especially the high temperature resistance is improved;

(2) The diaphragm of the present invention has a lower oil absorption rate and is more resistant to chemicals;

(3) The diaphragm of the present invention has more excellent low-frequency sensitivity;

(4) At least maintain a level of distortion equivalent to that of the existing diaphragm;

(5) The use requirement can be met by applying a single-layer structure, which simplifies the preparation process.

After testing, compared with the diaphragm without aliphatic polycarbonate, the diaphragm made of the thermoplastic polyester elastomer film layer of the present invention has significant advantages especially in aspect of resistance to high temperatures and chemicals as well as sensitivity, etc.

The aromatic dicarboxylic acid described in the present invention may be terephthalic acid, diphenyl dicarboxylic acid, naphthalene dicarboxylic acid, m-phenyl dicarboxylic acid or the substituted aromatic dicarboxylic acid thereof, etc., preferably terephthalic acid.

The dihydric alcohol described in the present invention may be ethylene glycol, butanediol, propylene glycol, cyclopentanediol, cyclohexanediol, etc., and may be any one of the above alcohols or a combination of multiple alcohols thereof.

The above-mentioned a polymerization of an aromatic dicarboxylic acid with a dihydric alcohol to form a hard segment, it may be a polymerization of one kind of aromatic dicarboxylic acid with one kind of dihydric alcohol, may be a polymerization of one kind of aromatic dicarboxylic acid with multiple dihydric alcohols, may be a polymerization of multiple aromatic dicarboxylic acids with one kind of dihydric alcohol, or may be a polymerization of multiple aromatic dicarboxylic acids with multiple dihydric alcohols.

The soft segment of the present invention may further added with one or more selected from the group consisting of polycaprolactone, polybutylene adipate, polytetrahydrofuran ether, and polyethylene oxide. Adding a small amount of the above polymers can help improve the block segment and the property of the polycarbonate soft polymerizability with the hard segment while maintaining the good strength, stiffness and resilience of the material. However, if the added exceeds 30%, it may affect the block structure characteristics of the entire material, resulting in the loss of the overall rigidity and resilience of the material. Since aliphatic polycarbonate has a stronger polarity, it is better than polyester or polyether block in terms of moisture and temperature resistance and chemical resistance etc., thus the content of aliphatic polycarbonate block in the soft segment is dominant, and the overall performance of material should be better. Correspondingly, the weight percentage of the aliphatic polycarbonate in the soft segment is preferably 70% or more, for example, may be 70%, 75%, 80%, 85%, 90%, 95%, 100%, etc. The polymer that is combined with aliphatic polycarbonate to form the soft segment is preferred a polycaprolactone. The weight ratio of polyhexamethylene polycarbonate diol to other polyesters in the soft segment may be controlled at about 5:1.

Meanwhile, the proportion of the hard segment and the soft segment in the thermoplastic polyester elastomer of the present invention has a significant impact on properties such as temperature resistance and damping, etc. Usually, the weight percentage of soft segment is preferably 20% to 80%, such as 20%, 30%, 40%, 50%, 60%, 70%, 80%, etc. The more the soft segment content, the lower the rigidity and strength of the material. While the diaphragm needs to vibrate to generate sound, SO a good rigidity and strength are necessary characteristics. According to the structural characteristics of the material, the soft segment content should not be higher than 80%. When the soft segment content is low, the hard segment characteristics of the entire material are dominant. Although the stiffness and strength of the material are significantly increased, the flexibility is reduced. In order to ensure that the loudspeaker achieve large displacement, large loudness and good waterproof resilience etc., the soft segment content should not be less than 25%. According to the requirements of modulus, strength and resilience required for the loudspeaker diaphragm vibration, the soft segment content is more preferably 25% to 60%, such as 25%, 30%, 35%, 40%, 45%, 50%, 55% %, 60%, etc.

In addition, due to the complexity of the chemical composition of polymers, their properties need to be limited in combination with practical applications.

As far as it is used for a diaphragm, when the thermoplastic polyester elastomer film layer of the present invention has a loss factor of 0.1 to 0.3 (using DMA temperature scanning mode, vibration frequency of 1 Hz, heating rate of 3° C./min, the loss factor is a data at 23° C.), it will have a good damping and can meet the needs of products for high performance and low performance. Due to the presence of polycarbonate segments in the thermoplastic polyester elastomer of the present invention, relative to polyester segments or polyether segments, polycarbonate segments have a higher polarity, and the steric hindrance of segment movement is larger, so when subjected to an external force, it may consume more energy, and thus it has a better damping than other types of thermoplastic elastomer materials, which can easily reach 0.1-0.3. When the loss factor is lower than 0.1, there is no advantage in distortion compared to polyether-polyester thermoplastic polyester elastomer; when the loss factor is higher than 0.2, the increase in damping of the material will lose the transient response of the material, and the diaphragm may not realize the feedback of the input signal perfectly, the sound quality will be deteriorated. On this basis, it is more preferably 0.1 to 0.2, such as 0.12, 0.14, 0.15, 0.16, 0.17, 0.18, 0.19, 0.2, etc.

In some embodiments, the thermoplastic polyester elastomer film layer has a tensile modulus of 20-500 Mpa (DMA temperature scanning mode, vibration frequency of 1 Hz, heating rate of 3° C./min, data at 23° C.). When the modulus is too low, the stiffness of the diaphragm is insufficient. If the F0 (minimum resonance frequency) required by the product is achieved, it can only be achieved by increasing the thickness, but the increase in thickness will increase the mass of the diaphragm, lose its vibration space and reduces the sensitivity of the quality control zone. When the modulus is high, the flexibility and resilience of the material become poor. In order to obtain high loudness, the product requires a large displacement of the diaphragm. At this time, the increase of modulus will inevitably bring adverse effects. According to product design and performance requirements, the recommendations are as follows: when the sound generating device has a lowest resonance frequency F0≤500 Hz, the tensile modulus of the diaphragm is 20-100 Mpa; when the sound generating device has a lowest resonance frequency F0>500 Hz, the tensile modulus of the diaphragm is 50-400 MPa. For example, when the sound generating device has a lowest resonance frequency F0 of 400 Hz, the tensile modulus of the diaphragm may be 50 Mpa. For example, when the sound generating device has a lowest resonance frequency F0 of 800 Hz, the tensile modulus of the diaphragm may be 300 Mpa.

In some embodiments, in order to ensure the consistency of the vibration of the loudspeaker diaphragm and reduce the polarization of the product, the film materials selected, the ratio between the storage modulus in the MD and TD directions of the thermoplastic polyester elastomer film layer is 80~120:100. In other words, the storage modulus difference between the MD and TD directions of the thermoplastic polyester elastomer film layer is controlled within ±20%, preferably within ±10%.

The diaphragm of the present invention is a single-layer diaphragm, and the thickness is more preferably 20-150 μm. If the thickness is too small, the stiffness of the diaphragm is likely to be insufficient and it is more difficult to make the diaphragm. If the thickness is too thick, the mass of the diaphragm increases, resulting in a decrease in the sound sensitivity of the diaphragm. Moreover, a thicker diaphragm will occupy a part of the vibration space, thereby reducing the vibration space of the diaphragm and affecting the sound generating effect of the sound generating device.

As for the preparation method of the thermoplastic polyester elastomer film layer in the present invention, it only involves conventional procedures, including copolymerization reaction, making granular resin, and finally using an extrusion equipment to form a film material.

Among them, the process conditions of the copolymerization reaction have a certain influence on the performance of the thermoplastic polyester elastomer. Usually, the raw materials are guaranteed to be in a molten state, and the hard segment and the soft segment are both selected as prepolymers.

In some preferred embodiments, the polyester hard segment prepolymer obtained by reacting aromatic dicarboxylic acid with dihydric alcohol has a molecular weight of 15000-

30000, such as 15000, 20000, 25000, 30000, etc. The aliphatic polycarbonate soft segment prepolymer preferably has a molecular weight of 10000-50000, such as 10000, 15000, 20000, 25000, 30000, 35000, 40000, 45000, 50000, etc. The temperature of the copolymerization reaction is preferably 230-265° ° C., and the reaction time is preferably 0.5-2 h. In a specific example of the present invention, the molecular weight of the polyester hard segment prepolymer obtained by the reaction of aromatic dicarboxylic acid with dihydric alcohol is 22000, the molecular weight of the aliphatic polycarbonate soft segment prepolymer is 36000, and the copolymerization reaction temperature is 250° C. and the reaction time is 1 h.

Usually, the copolymerization reaction is also added with catalyzer and stabilizer, and the type may be a typical auxiliary agent, for example, the stabilizer is preferably polycarbodiimide, and the catalyzer is preferably n-butyl titanate, and the amount of them may be adjusted depending on actual situation. The end point of the copolymerization reaction is usually the point when the resin becomes uniform and transparent.

The granulation is usually carried out in a slicer or pelletizer.

For the extrusion film forming process, it is usually carried out in an extruder, and an appropriate amount of processing aids (such as plasticizers, slip agents, lubricants, etc.) can also be added to the screw to melt, and then output to the T die after being dispersed and mixed by the screw. In order to reduce the orientation of the film, after the melt flows out from the T die, an auxiliary material (such as a release film or release paper, etc.) of a certain thickness may be added to one surface of the film before passing cooling rolls, and after flattening and shaping, roll together. The types and amounts of processing aids are typical in the art.

The diaphragm provided by the present invention can be formed into a sound generating device of any structure, such as a sound generating device typical as follows: comprising a vibrating system and a magnetic circuit system matched with the vibrating system, the vibrating system comprises the diaphragm and a voice coil coupled to a side of the diaphragm. When the sound generating device is working, the voice coil can vibrate up and down under the action of the magnetic field force of the magnetic circuit system after the voice coil is energized to drive the vibration of the diaphragm, and the sound can be generate when the diaphragm vibrates.

According to another embodiment of the present invention, the sound generating device may include a housing and a magnetic circuit system and a vibration system disposed in the housing. The vibration system may include a voice coil, a first diaphragm and a second diaphragm, and the top of the voice coil is connected to the first diaphragm, the magnetic circuit system drives the voice coil to vibrate to drive the first diaphragm to generate sound, and the two ends of the second diaphragm are respectively connected to the housing and the bottom of the voice coil. Among them, the second diaphragm may be the diaphragm according to the foregoing embodiments of the present invention.

That is, the first diaphragm can be used to vibrate and generate sound, and the second diaphragm can be used to balance the vibration of the voice coil. Specifically, when the sound generating device is working, the voice coil can vibrate up and down under the action of the magnetic field force of the magnetic circuit system after the voice coil is energized to drive the first diaphragm to vibrate, and the first diaphragm can vibrate to generate sound. The second diaphragm can also vibrate up and down with the voice coil. Since the two ends of the second diaphragm are respectively connected to the housing and the bottom of the voice coil, the second diaphragm can balance the vibration of the voice coil and prevent the polarization phenomenon of the voice coil. Therefore, the sound generate effect of the sound generate device can be improved.

It should be noted that, the first diaphragm and the second diaphragm can adopt the diaphragm of the above-mentioned embodiment of the present invention at the same time, or one of the first diaphragm and the second diaphragm can adopt the diaphragm of the above-mentioned embodiment of the present invention. The present invention is not specifically limited to this.

The following will be described in conjunction with specific embodiments.

Example 1

Step 1. Preparation of Resin Particles

In a reaction tank of inert gas atmosphere, 70 parts by mass of polybutylene terephthalate prepolymer with a number average molecular weight of 25000, 25 parts by mass of polyhexamethylene polycarbonate diol with a number average molecular weight of 15000, and 5 parts by mass of polycaprolactone were added, 0.15 parts by mass of n-butyl titanate as catalyst was added, and 0.5 parts by mass of polycarbodiimide was added. After the temperature is slowly raised to a molten state (230-265° C.), the reaction is continued for about 1 hour, until the resin becomes uniform and transparent. After cooling, it is cut into granules with a slicer or granulator for the film preparation.

Step 2. Preparation of Film Materials

The method of melt extrusion and casting is adopted. Before the film preparation, the particles are first dried and dehydrated, then added to the screw to melt. After dispersed and mixed by the screw, it is output to the T-die. In order to reduce the orientation of the film, after the melt flows out of the T-die, an auxiliary material (such as a release film or release paper, etc.) of a certain thickness may be added to one surface of the film before passing cooling rolls, and after flattening and shaping, roll together. By controlling the speed of the vehicle and the pressure between the cooling rolls, etc., it is ensured that the difference of the storage modulus of the obtained thermoplastic polyester elastomer film in the MD and TD directions is within +10%.

Example 2

Step 1. Preparation of Resin Particles

In a reaction tank of inert gas atmosphere, 70 parts by mass of polybutylene terephthalate prepolymer with a number average molecular weight of 25000, 30 parts by mass of polyhexamethylene polycarbonate diol with a number average molecular weight of 15000, and 0.15 parts by mass of n-butyl titanate as catalyst were added, and 0.5 parts by mass of polycarbodiimide was added. After the temperature is slowly raised to a molten state (230-265° C.), the reaction is continued for about 1 hour, until the resin becomes uniform and transparent. After cooling, it is cut into granules with a slicer or granulator for the film preparation. The infrared spectrogram of the resin is shown in FIG. 1, which shows that there is an obvious characteristic absorption peak of C═O of soft segment polycarbonate near 1743 $cm^{-1}$.

Step 2. Preparation of Film Materials

The method of melt extrusion and casting is adopted. Before the film preparation, the particles are first dried and dehydrated, then added to the screw to melt, dispersed and mixed by the screw, and then output to the T-die. In order to reduce the orientation of the film, after the melt flows out of the T-die, an auxiliary material (such as a release film or release paper, etc.) of a certain thickness may be added to one surface of the film before passing cooling rolls, and after flattening and shaping, roll together. By controlling the speed of the vehicle and the pressure between the cooling rolls, etc., it is ensured that the difference of the storage modulus of the obtained thermoplastic polyester elastomer film in the MD and TD directions is within +10%.

Comparative Example

Step 1. Preparation of Resin Particles

In a reaction tank of inert gas atmosphere, 70 parts by mass of polybutylene terephthalate prepolymer with a number average molecular weight of 25000, 30 parts by mass of polytetrahydrofuran ether blocks with a number average molecular weight of 2000, and 0.15 parts by mass of n-butyl titanate as catalyst were added, and 0.5 parts by mass of polycarbodiimide was added. After the temperature is slowly raised to a molten state (230-265° C.), the reaction is continued for about 1 hour, until the resin becomes uniform and transparent. After cooling, it is cut into granules with a slicer or granulator for the film preparation. The infrared spectrogram of the resin was shown in FIG. 1.

Step 2. Preparation of Film Materials

The method of melt extrusion and casting is adopted. Before the film preparation, the particles are first dried and dehydrated, then added to the screw to melt, dispersed and mixed by the screw, and then output to the T-die. In order to reduce the orientation of the film, after the melt flows out of the T-die, an auxiliary material (such as a release film or release paper, etc.) of a certain thickness may be added to one surface of the film before passing cooling rolls, and after flattening and shaping, roll together. By controlling the speed of the vehicle and the pressure between the cooling rolls, etc., it is ensured that the difference of the storage modulus of the obtained thermoplastic polyester elastomer film in the MD and TD directions is within +10%.

Testing the Properties of Different Thermoplastic Polyester Elastomer Films

1. Evaluation of Heat Resistance

Test method: Use TMA equipment, select the film materials of the Comparative Example, Example 1 and Example 2 with a thickness of 20 um, adopt a tensile mode, maintain the tensile stress at 1 MPa, and increase the temperature from room temperature to 200° C. at a heating rate of 3° C./min. The instrument will record and output the length change curve of the material at different temperatures during the test.

Figure 2:
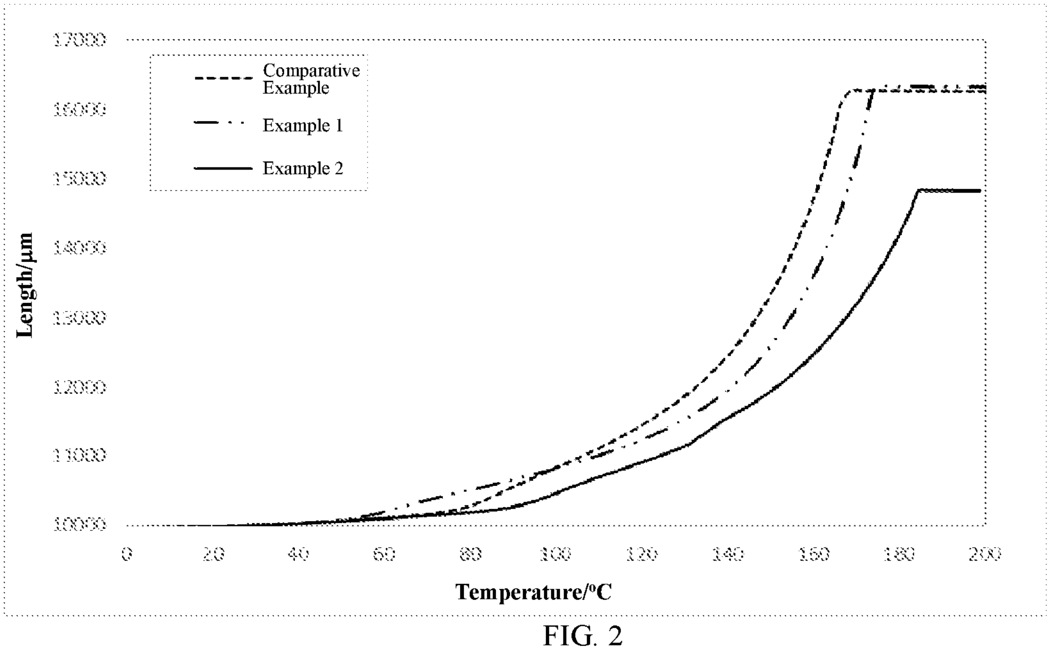
FIG. 2 is a graph showing the displacement change of the material at different temperatures under a 1 MPa force.

The results show that as shown in FIG. 2, the length of the material will increase as the temperature increases under the stress state. It is not difficult to understand that the greater the change in length with temperature, the worse the high temperature resistance of material. It can be seen that, in terms of heat resistance, Example 2 is better than Example 1, and much better than the Comparative Example.

2. Oil Absorption Rate Test

Test method: Cut materials with similar mass and weigh them with an analytical balance to record the mass $M_1$, soak them in oleic acid for 24 hours, take out and wipe the oleic acid on the surface with a dust-free cloth, then weigh the mass $M_2$. The chemical resistance can be obtained by comparing the change of mass of the materials before and after oleic acid absorption.

The results show that as shown in Table 1, the oil absorption rate of the Comparative Example is the highest, and the oil absorption rate of the Example 2 is the lowest. It can be speculated that the presence of polycarbonate soft segments is beneficial to block the immersion of small organic molecules and improve the chemical resistance of the entire material.

TABLE 1

Comparison of Oil Absorption Rate

| Sample | $M_1$/g | $M_2$/g | oil absorption rate |
|---|---|---|---|
| Comparative Example | 0.1091 | 0.1233 | 13.02% |
| Example 1 | 0.1115 | 0.1209 | 8.43% |
| Example 2 | 0.1507 | 0.1579 | 4.78% |

3. Test the Tensile Modulus and Loss Factor of Thermoplastic Polyester Elastomer Film Test method: Use a cutting knife or a utility blade to take a flat rectangular sample with a width of 5-10 mm from the film, and the testing is performed according to ASTM D412-2016 standard. The vibration frequency of the test is 1 Hz and the temperature is 23° C.

The results shows that as shown in Table 2, Comparative Example and Example have similar storage modulus at room temperature, but the modulus under the high temperature of Example is higher than that of Comparative Example, indicating that the present invention has a more stable structural strength at high temperature. The peak temperature of the loss modulus is the glass transition temperature of the material and represents the onset temperature at which the thermoplastic polyester elastomer material has high elastic properties. From the curve of loss modulus with temperature, it can be seen that the present invention has a lower glass transition temperature. It can be seen from the above that the thermoplastic polyester elastomer of the present invention has a wider service temperature range. In addition, it can be seen from FIG. 2 that the Example has of the higher (loss factor damping material=ratio of loss modulus to storage modulus).

TABLE 2

| | properties of thermoplastic polyester elastomer | | |
|---|---|---|---|
| Sample | Soft segment type | Tensile modulus (MD/TD)/MPa | loss factor |
| Comparative Example | polyether type | 280/271 | 0.08 |
| Example 2 | polycarbonate type | 260/253 | 0.13 |

Testing the F0, Sensitivity and Total Harmonic Distortion Curves of Diaphragms Made of Different Thermoplastic Polyester Elastomers 1. Prepare the Diaphragm The thermoplastic polyester elastomer films in Example 2 and Comparative Example were respectively selected to prepare diaphragms. Among them, the diaphragm in Example 2 adopts a single-layer structure, that is, the diaphragm in Example 2 includes only one layer of thermoplastic polyester elastomer layer with a thickness of 45 μm. The diaphragm in Comparative Example adopts a three-layer composite structure, which includes a middle layer and two surface layers. The middle layer is an acrylic adhesive layer, and the two surface layers are respectively the corresponding thermoplastic polyester elastomer layers. The thicknesses of the middle layer and the two surface layers are all 20 μm. That is, the difference between the diaphragm in Example 2 and Comparative Example lies in: (1) the materials of the thermoplastic polyester elastomer film layers in the two diaphragms are different; (2) the diaphragm in Example 2 is a single layer structure, the diaphragm in Comparative Example has a three-layer composite structure.

Figure 3:
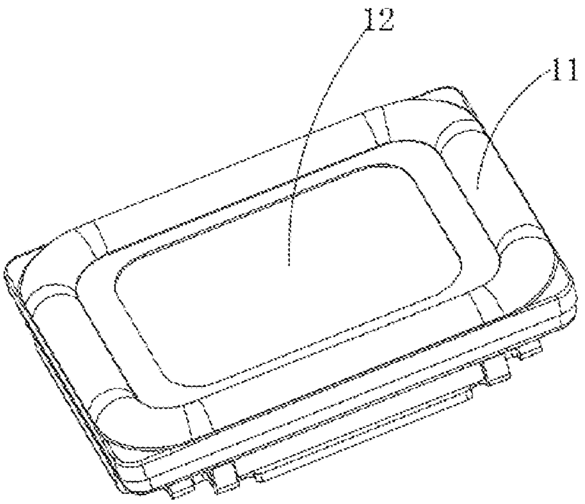
FIG. 3 is a structural schematic diagram of the loudspeaker provided by the present invention.
Figure 4:
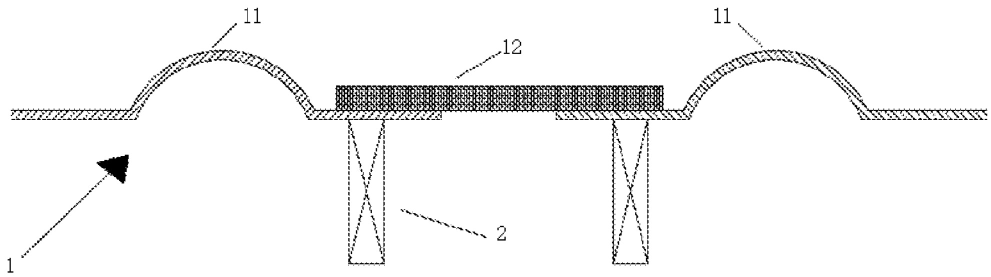
FIG. 4 is a structural schematic diagram of the sound generating vibration unit in FIG. 3.

The manufacturing method of the diaphragm in Example 2 is as follows: place the prepared thermoplastic polyester elastomer film layer on a thermocompression molding machine to perform a secondary molding, prepare the required diaphragm shape, cut it to the product size, and then assemble it into the micro loudspeaker unit together with components such as voice coil, magnetic circuit system and the like (as shown in FIG. 3 and FIG. 4).

The manufacturing method of the diaphragm in Comparative Example is as follows: the prepared thermoplastic polyester elastomer film layer and the acrylic adhesive layer are laminated alternately to form a composite structure of thermoplastic polyester elastomer film layer+acrylic adhesive layer+thermoplastic polyester elastomer film layer, thus prepare the composite material belt with the required matching. Place the above-mentioned composite material belt on a thermocompression molding machine to perform a secondary molding to prepare the required diaphragm shape. Cut it to the product size and assemble it into the micro loudspeaker unit together with the components such as voice coil, magnetic circuit system and the like (as shown in the FIG. 3 and FIG. 4).

2. Test Method

Product performance tests were performed on the micro-loudspeakers (SPK) equipped with the diaphragms in the above-mentioned Example 2 and the Comparative Example, respectively. The micro-loudspeaker adopts the structure shown in FIG. 3, which includes a vibration system and a magnetic circuit system matched with the vibration system, and the vibration system comprises the diaphragm and a voice coil coupled to a side of the diaphragm. The loudspeaker vibration unit is shown in FIG. 4, and those skilled in the art can make corresponding adjustments to according actual product requirements. For example, as shown in FIG. 3 and FIG. 4, the diaphragm 1 is composed of a folded ring part 11 and a ball top part 12, and the thermoplastic polyester elastomer layer may be located at the folded ring part 11 of the diaphragm, or at the folded ring part 11 and the ball top part 12. The folded ring part 11 protrudes toward the side away from voice coil 2; the ball top part 12 is connected to the folded ring part 11; and a centring strut is added to the vibration system, thereby can improve the anti-polarization capability and the like of the vibration system.

Figure 5:
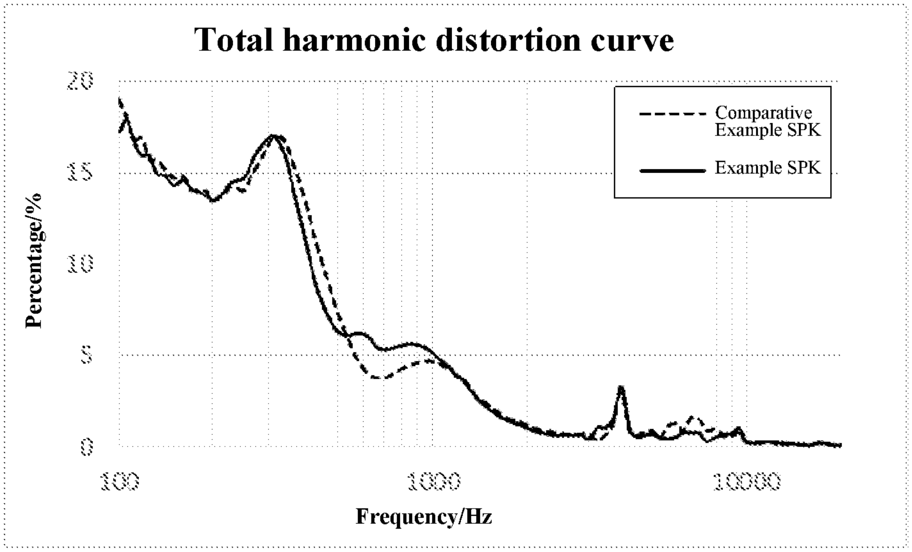
FIG. 5 is a total harmonic distortion curve of Example and Comparative Example.

The results show that as shown in Table 3 and FIG. 5, Comparative Example and Example 2 have a similar F0. Although Example is a single thermoplastic polyester elastomer film, the an product shows excellent low-frequency sensitivity (characterized by sound pressure level (SPL)), and the sensitivity is improved by about 2 dB compared to Comparative Example. In Example 2, under the premise that the F0 of the product is lower than that of Comparative Example, the distortion does not increase significantly. It can be seen that a single layer of thermoplastic polyester elastomer should be able to meet the needs of use, and has an even better performance than that of the composite diaphragm of conventional polyether polyester elastomer.

TABLE 3

| | Product structure and performance | | |
|---|---|---|---|
| Sample | Diaphragm structure | Product F0/Hz | SPL@500 Hz (dB) |
| Comparative Example | three-layer composite structure | 853 | 100.1 |
| Example 2 | single layer | 830 | 102.0 |

The above is only a preferred embodiment of the present invention, but the scope of protection of the present invention is not limited thereto. Any person skilled in the art can easily think of changes or replacements within the technical scope disclosed by the present invention, and these should be covered within the protection scope of the present invention. Therefore, the protection scope of the present invention should be defined by the protection scope of the claims.

What is claimed is:

1. A diaphragm for sound generating devices, characterized in that the diaphragm comprises only one layer of a thermoplastic polyester elastomer film, wherein the thermoplastic polyester elastomer is formed by copolymerization of a polyester hard segment which is prepared by reacting an aromatic dicarboxylic acid with a dihydric alcohol, and a soft segment containing an aliphatic polycarbonate, wherein the aliphatic polycarbonate comprises a polyhexamethylene polycarbonate diol, and accounts for 70% or more of a weight of the soft segment, and wherein the diaphragm has a thickness of 10-200 μm , and a loss factor of 0.1-0.3 at a temperature of 23° C.

2. The diaphragm according to claim 1, characterized in that the soft segment further comprises one or more selected from the group consisting of polycaprolactone, polybutylene adipate, polytetrahydrofuran ether, and polyethylene oxide.

3. A diaphragm for sound generating devices, characterized in that the diaphragm comprises only one layer of a thermoplastic polyester elastomer film wherein the thermoplastic polyester elastomer is formed by copolymerization of a polyester hard segment which is prepared by reacting an aromatic dicarboxylic acid with a dihydric alcohol, and a soft segment containing an aliphatic polycarbonate wherein the diaphragm has a thickness of 10-200 μm, and a loss factor of 0.1-0.3 at a temperature of 23°0 C., and wherein the soft segment accounts for 20%-80% by weight of the thermoplastic polyester elastomer.

4. The diaphragm according to claim 3, characterized in that the soft segment accounts for 30%-60% by weight of the thermoplastic polyester elastomer.

5. The diaphragm according to claim 1, characterized in that the hard segment comprises polybutylene terephthalate.

6. The diaphragm according to claim 1, characterized in that the diaphragm has a loss factor of 0.1-0.2 at a temperature of 23° C.

7. The diaphragm according to claim 1, characterized in that, at a temperature of 23° C.:

when the sound generating device has a lowest resonance frequency F0≤500 Hz, the diaphragm has a tensile modulus of 20-100 MPa; or when the sound generating device has a lowest resonance frequency F0≤500 Hz, the diaphragm has a tensile modulus of 50-400 MPa.

8. The diaphragm according to claim 1, characterized in that the diaphragm has a ratio between the storage modulus in the MD and TD directions of 80-120:100.

9. A preparation method of a diaphragm for sound generating devices characterized in that the preparation method comprises:

carrying out a copolymerization reaction of a prepolymer of the hard segment and a prepolymer of the soft segment at a temperature of 230-265° C. for 0.5-2 h; and forming a film by pelletizing and extruding, wherein the diaphragm comprises only one layer of a thermoplastic polyester elastomer film, wherein the thermoplastic polyester elastomer is formed by copolymerization of a polyester hard segment which is prepared by reacting an aromatic dicarboxylic acid with a dihydric alcohol, and a soft segment containing an aliphatic polycarbonate, and wherein the diaphragm has a thickness of 10-200 μm, and a loss factor of 0.1-0.3 at a temperature of 23° C.

10. The preparation method of the diaphragm according to claim 9, characterized in that the prepolymer of the hard segment has a molecular weight of 15000-30000, and the prepolymer of the soft segment has a molecular weight of 10000-50000.

11. A sound generating device, characterized in that the sound generating device comprises the diaphragm according to claim 1.

* * * * *